United States Patent
Montag

(10) Patent No.: US 7,694,027 B2
(45) Date of Patent: Apr. 6, 2010

(54) SYSTEM AND METHOD FOR PERIPHERAL COMMUNICATION WITH AN INFORMATION HANDLING SYSTEM

(75) Inventor: Bruce Montag, Austin, TX (US)

(73) Assignee: Dell Products L.P., Round Rock, TX (US)

(*) Notice: Subject to any disclaimer, the term of this patent is extended or adjusted under 35 U.S.C. 154(b) by 612 days.

(21) Appl. No.: 11/458,130

(22) Filed: Jul. 18, 2006

(65) Prior Publication Data

US 2008/0052426 A1  Feb. 28, 2008

(51) Int. Cl.
G06F 3/00 (2006.01)
G06F 13/12 (2006.01)
G06F 13/38 (2006.01)

(52) U.S. Cl. .............. 710/7; 710/30; 710/62; 710/69

(58) Field of Classification Search .............. None
See application file for complete search history.

(56) References Cited

U.S. PATENT DOCUMENTS

| | | | |
|---|---|---|---|
| 6,084,638 A | 7/2000 | Hare et al. | 348/552 |
| 2004/0015597 A1 | 1/2004 | Thornton | 709/231 |
| 2004/0083302 A1 | 4/2004 | Thornton | 709/231 |
| 2006/0195574 A1* | 8/2006 | Sakai | 709/225 |
| 2007/0241990 A1* | 10/2007 | Smith et al. | 345/5 |

OTHER PUBLICATIONS www.polycom.com "Polycom Worldwide:—Where Voice, Video, and Data Meet—Easily!: Polycom Worldwide" Polycom, Inc. 2006, printed Aug. 9, 2006 (1 page).

* cited by examiner

*Primary Examiner*—Henry W. H. Tsai
*Assistant Examiner*—Kris Rhu
(74) *Attorney, Agent, or Firm*—Hamilton & Terrile, LLP; Robert W. Holland

(57) ABSTRACT

Videoconferencing through an information handling system is supported with a display, camera and microphone that communicate with the information handling system through a single cable, such as a DisplayPort cable. Visual information is communicated from the information handling system to the display through a unidirectional main link and display control information is communicated between the information handling system and the display through a bidirectional auxiliary link. Peripheral information, such as digitized audio signals captured by the microphone and packetized video information capture by the camera, are communicated to the information handling system through the auxiliary link. Peripheral commands generated at the information handling system, such as camera control commands, are communicated from the information handling system to the peripheral through the auxiliary link.

17 Claims, 2 Drawing Sheets

SYSTEM AND METHOD FOR PERIPHERAL COMMUNICATION WITH AN INFORMATION HANDLING SYSTEM

BACKGROUND OF THE INVENTION

1. Field of the Invention

The present invention relates in general to the field of information handling system peripherals, and more particularly to a system and method for peripheral communication with an information handling system management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically communicate with peripheral devices, such as displays, cameras and microphones, through standardized interfaces. The use of standardized interfaces allows a variety of manufacturers to provide peripherals for a variety of information handling system platforms. For example, the VGA interface defined cable connections to communicate a video signal from an information handling system to a display. As another example, the USB interface defines a serial cable connection that communicates information between an information handling system and a variety of types of devices. One difficulty with standardized interfaces is that, as information handling system components operate at greater speeds to communicate greater amounts of information, the standardized connections eventually tend to provide insufficient bandwidth. In response, information handling system and peripheral manufacturers periodically coordinate the development of more advanced standards that will meet increasing bandwidth demands. For instance, the VESA standards group has recently introduced the VESA DisplayPort 1.0 specification. DisplayPort is a multi-laned two-way serial interface for connecting a source device, such as on an information handling system that generates a video signal, with a sink device, such as a display that presents the video signal. The DisplayPort interface has a one-way high speed link with one to four lanes that transmits video pixel and audio sample information to the display in a micro-packet architecture and a separate bi-directional auxiliary link with a single lane that transmits control information to and from the display also in a micro-packet architecture. The control information allows an end user to manage display operations, such as by obtaining EDID information, with the information handling system.

Although standardized interfaces improve information handling system user options for the selection of peripheral devices, the wide variety and large number of available peripherals often lead to end user confusion. For example, video conferencing through information handling systems has been available for some time, however, technical barriers due to network bandwidth, audiovisual synchronization, software support and device complexity have held back mainstream adoption of video conferencing. Although many of these difficulties have been addressed in high speed networking standards that now include quality of service provisions and in operating system updates that feature support for real-time communication, device complexity remains pervasive at least in part due to the connectivity requirements of information handling systems. For instance, videoconferencing with an information handling system typically requires a display, a camera, a microphone, speakers, and a network connection, such as through a modem or a local area network. Each peripheral device connection adds to system complexity, increases clutter around the system with each separate cable and tends to discourage end users from adopting videoconferencing.

SUMMARY OF THE INVENTION

Therefore a need has arisen for a system and method which reduces the number of cables needed to connect plural peripheral devices to an information handling system.

In accordance with the present invention, a system and method are provided which substantially reduce the disadvantages and problems associated with previous methods and systems for connecting peripheral devices to an information handling system. Display peripherals communicate with an information handling system through a display cable auxiliary link so that the display and the display peripherals both communicate with the information handling system through a single cable.

More specifically, an information handling system interfaces with a display through a single cable having a unidirectional main link, which communicates audiovisual information to the display, and a bidirectional auxiliary link, which supports communication of display control information to and from the information handling system. Display peripherals integrated or otherwise associated with the display, such as a camera and microphone, generate peripheral information at the display for communication to the information handling system, such as visual information captured by the camera or audio information captured by the microphone. The peripheral information is communicated to the information handling system through the auxiliary link of the display cable. Peripheral control information generated at the information handling system, such as camera control commands, is also communicated through the auxiliary link.

The present invention provides a number of important technical advantages. One example of an important technical advantage is that plural peripherals interface with an information handling system through a single cable. For example, the display, camera, microphone and speakers needed to support video conferencing are each supported through a common display cable. Setting up and using an information handling system with plural peripherals is simplified by the use of a single cable to communicate between each of the peripherals and the information handling system. Further the area around the information handling system is less cluttered and more user friendly. Thus, end users are encouraged to interface and use peripherals to perform advanced functions such as videoconferencing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Communicating between a display peripheral and an information handling system through a single display cable reduces the complexity of using display peripherals, such as a camera and a microphone to support videoconferencing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
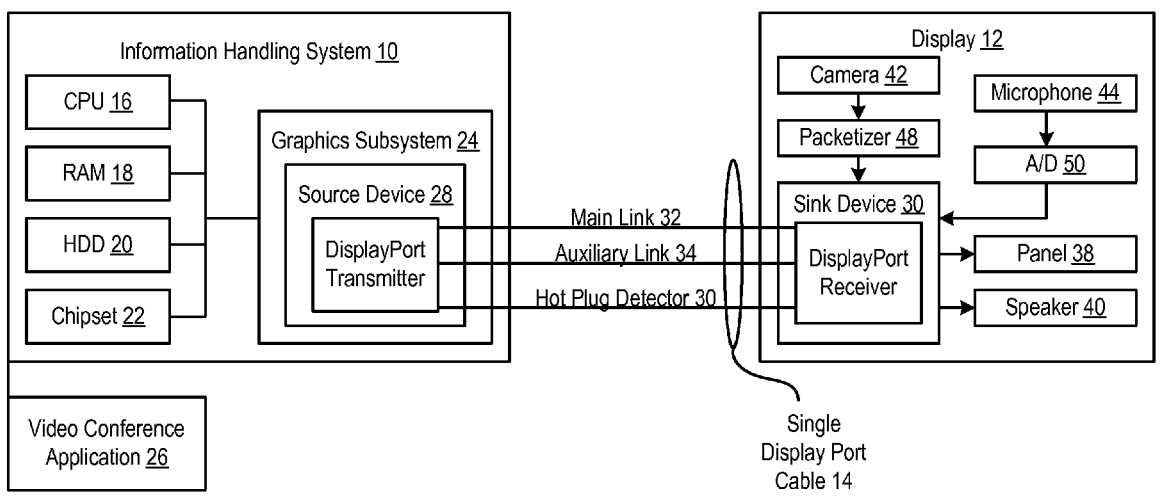
FIG. 1 depicts a block diagram of an information handling system and display configured to support videoconferencing through a single cable connection.

Referring now to FIG. 1, a block diagram depicts an information handling system 10 and display 12 configured to support videoconferencing through a single cable connection 14, such as a DisplayPort cable. Information handling system 10 has plural processing components to process information, such as a CPU 16, RAM 18, a hard disk drive 20, a chipset 22 and a graphics subsystem 24. For example, the processing components support the running of applications, such as a videoconferencing application 26, which generate information for presentation at display 12. Graphics subsystem 24 communicates visual and audio information to display 12 through a source device 28 that communicates over cable 14 to a sink device 30. A main link 32 of cable 14 provides one to four lanes of unidirectional information communication that transmits visual and audio information via a micro-packet architecture. Sink device 30 receives the visual and audio information to provide the visual information to a display panel 38 for presentation of a visual image and to speakers 40 for presentation of audible sounds. An auxiliary link 34 of cable 14 provides one lane of bidirectional information communication that transmits control information between source device 28 and sink device 30. For example, the control information includes EDID information stored on display 12 and sent to information handling system 10 or display presentation commands generated at information handling system 10 and sent to display 12, such as commands to alter display brightness and contrast. A hot plug detect cable 36 supports hot plug detection of display 12 by information handling system 10.

Display 12 has a variety of display peripherals integrated with it, such as a camera 42 and a microphone 44, which generate display peripheral information, such as visual information captured by camera 42 and audio information captured by microphone 44. The display peripherals support applications running on information handling system 10, such as video conferencing application 26 which uses visual and audio information captured by the display peripherals to communicate audiovisual images to another information handling system through a network. To support communication of information from the display peripherals to information handling system 10, the display peripheral information is packetized in the micro-packet architecture used for auxiliary link 34 and sent over auxiliary link 34 to a peripheral module 46 associated with source device 28. Peripheral module 46 extracts the display peripheral information sent over auxiliary link 34 and provides the display peripheral information to the processing components, such as central processing unit 16, for use, such as in support of a video conference. The bandwidth across auxiliary link 34 is shared to communicate both display control information and display peripheral information.

The peripheral devices have associated support systems for formatting peripheral information for communication through auxiliary link 34. For example, camera 42 generates visual information in a compressed format, such as video compressed with an MPEG format, that is packetized with a packetizer 48. Packetizer 48 also monitors information received from information handling system 10 through auxiliary link 34 to retrieve camera control commands sent from information handling system 10, such as focusing, zooming or otherwise altering the operation of camera 42. The peripheral control information is applied at camera 42 to alter operations in accordance with the commands, thus allowing control of camera 42 by video conference application 26 without requiring a separate cable. Microphone 44 generates audio signals, such as an analog signal that is converted into digitized sample by analog-to-digital converter 50. The audio information is inserted into micro-packets sent across auxiliary link 34, such as by having analog-to-digital converter 50 map LPCM data into DisplayPort packets. The display peripherals may be integrated directly into display 12 with internal wiring, or may be removably connected, such as at ports accessible at display 12.

Figure 2:
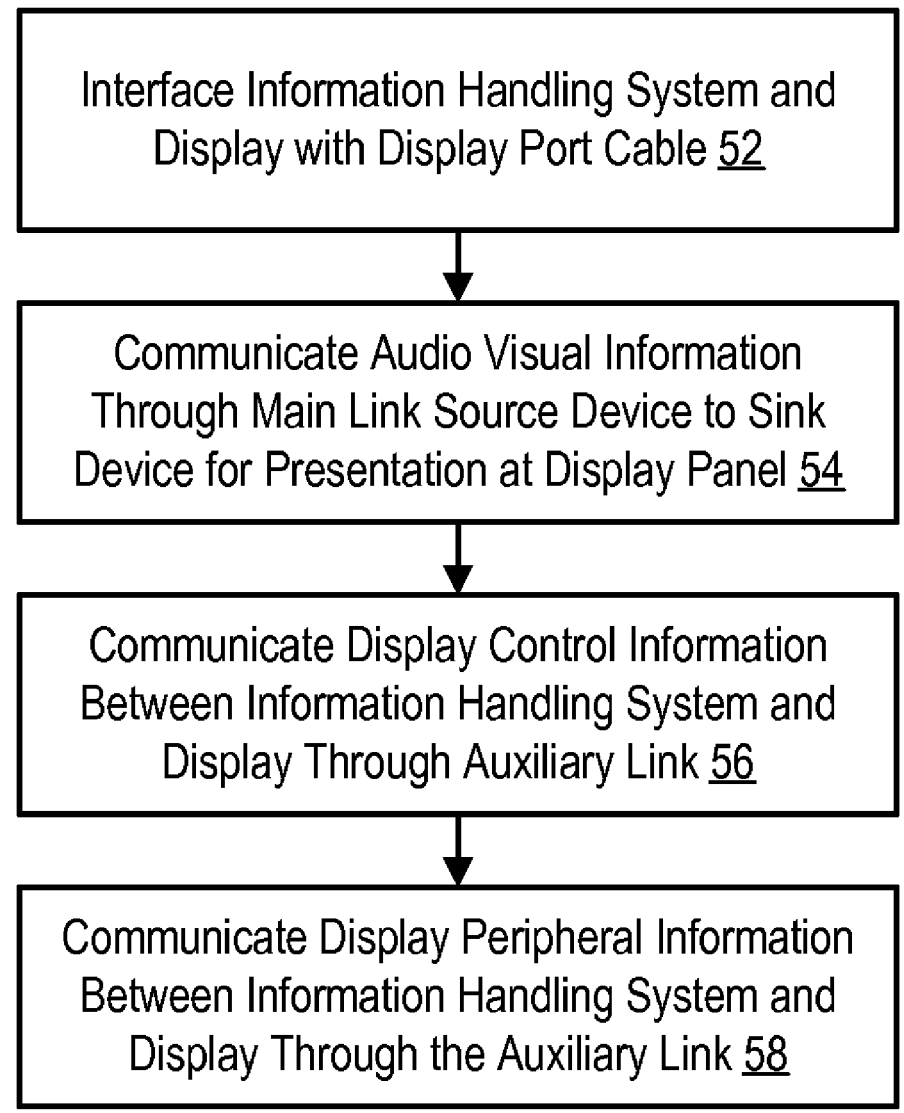
FIG. 2 depicts a flow diagram of a process for communicating display peripheral information between an information handling system and a display.

Referring now to FIG. 2, a flow diagram depicts a process for communicating display peripheral information between an information handling system and a display. The process begins at step 52 with the interfacing of the information handling system and display by a single cable, such as a DisplayPort cable. At step 54, audiovisual information is communicated through a main link of the cable from a source device associated with the information handling system to a sink device associated with the display. For example, digitized pixel and speaker information is communicated for display as an image and playing of sound. At step 56, display control information is communicated between the information handling system and display through an auxiliary link of the cable to manage the display operations. At step 58, display peripheral information is communicated between the information handling system and display through the auxiliary link to support information handling system use of the display peripherals. As an example, visual information captured by a camera integrated in the display and audio information captured by a microphone are sent from the display sink device to the information handling system source device and extracted for use by the information handling system. In addition, camera control commands generated at the information handling system are communicated through the auxiliary link to the display for controlling the camera operations.

Although the present invention has been described in detail, it should be understood that various changes, substitutions and alterations can be made hereto without departing from the spirit and scope of the invention as defined by the appended claims.

What is claimed is:

1. An information handling system comprising: a central processing unit operable to process information; memory interfaced with the central processing unit and operable to store the information; a graphics subsystem interfaced with the central processing unit and the memory, the graphics subsystem operable to process the information into visual information for presentation at a display; a graphics cable interfaced with the graphics subsystem, the graphics cable having a main link operable to communicate the visual information to a display and an auxiliary link operable to communicate control information from the graphics subsystem to the display and from the display to the graphics subsystem; and a peripheral module associated with the graphics subsystem and interfaced with the graphics cable auxiliary link, the peripheral module operable to send and receive peripheral information through the auxiliary link for communication between a display peripheral device and the graphics subsystem, wherein the display peripheral device comprises a camera and the peripheral information comprises packetized visual information captured by the camera.

2. The information handling system of claim 1 wherein the peripheral information comprises camera control commands sent from the central processing unit to the camera.

3. An information handling system comprising: a central processing unit operable to process information; memory interfaced with the central processing unit and operable to store the information; a graphics subsystem interfaced with the central processing unit and the memory, the graphics subsystem operable to process the information into visual information for presentation at a display; a graphics cable interfaced with the graphics subsystem, the graphics cable having a main link operable to communicate the visual information to a display and an auxiliary link operable to communicate control information from the graphics subsystem to the display and from the display to the graphics subsystem; and a peripheral module associated with the graphics subsystem and interfaced with the graphics cable auxiliary link, the peripheral module operable to send and receive peripheral information through the auxiliary link for communication between a display peripheral device and the graphics subsystem, wherein the display peripheral device comprises a microphone and the peripheral information comprises packetized audio information captured by the microphone.

4. The information handling system of claim 1 further comprising a display interfaced with the graphics cable and operable to present the visual information, the display having an integrated display peripheral operable to send and receive peripheral information with the peripheral module through the auxiliary link.

5. The information handling system of claim 4 wherein the display peripheral comprises a camera operable to capture visual information, the camera having a packetizer operable to packetize the visual information for communication as packets to the peripheral module through the auxiliary link.

6. The information handling system of claim 5 wherein the display further has an integrated microphone operable to capture audio information, the microphone having an analog to digital converter operable to convert the audio information into a digital format for communication to the peripheral module through the auxiliary link.

7. The information handling system of claim 6 further comprising a videoconferencing application running on the central processing unit and operable to apply the visual and audio information from the peripheral module to support a videoconference.

8. A method for interfacing a peripheral and an information handling system, the method comprising: interfacing the information handling system and a display with a cable; communicating visual information from the information handling system to the display through a main link of the cable; communicating control information between the information handling system and the display through an auxiliary link of the cable; interfacing a peripheral device with the display; and communicating peripheral information from the peripheral device to the information handling system through the auxiliary link, wherein the peripheral device comprises a microphone and communicating peripheral information further comprises communicating audio information captured by the microphone to the information handling system.

9. The method of claim 8 wherein the cable comprises a DisplayPort cable.

10. The method of claim 8 wherein communicating audio information further comprises: converting the audio information from an analog signal to digital samples; sending the digital samples through the auxiliary link as packets.

11. A method for interfacing a peripheral and an information handling system, the method comprising: interfacing the information handling system and a display with a cable; communicating visual information from the information handling system to the display through a main link of the cable; communicating control information between the information handling system and the display through an auxiliary link of the cable: interfacing a peripheral device with the display; and communicating peripheral information from the peripheral device to the information handling system through the auxiliary link, wherein the peripheral device comprises a camera and communicating peripheral information further comprises communicating video information captured by the camera to the information handling system.

12. The method of claim 11 wherein communicating video information further comprises: packetizing the video information into packets; and sending the packets through the auxiliary link.

13. The method of claim 11 further comprising: generating camera control information at the information handling system; sending the camera control information to the camera through the auxiliary link.

14. The method of claim 13 wherein the camera control information comprises zooming the camera.

15. A system for communicating peripheral information between a display peripheral and an information handling system, the system comprising: a display peripheral interfaced with a display and operable to generate the peripheral information; a sink device associated with the display and interfaced with the display peripheral, the sink device operable to receive visual information from an information handling system through a cable main link and to send control information through a cable auxiliary link, the sink device further operable to send the peripheral information to the information handling system through the auxiliary link; and a source device associated with the information handling system, the source device operable to send visual information to the sink device through the cable main link and to receive the control information through the cable auxiliary link, the source device further operable to receive the peripheral information through the auxiliary link, wherein the display peripheral comprises a microphone and the peripheral information comprises digitized audio signals captured from the microphone.

16. A system for communicating peripheral information between a display peripheral and an information handling system, the system comprising: a display peripheral interfaced with a display and operable to generate the peripheral information; a sink device associated with the display and interfaced with the display peripheral, the sink device operable to receive visual information from an information handling system through a cable main link and to send control information through a cable auxiliary link, the sink device further operable to send the peripheral information to the information handling system through the auxiliary link; and a source device associated with the information handling system, the source device operable to send visual information to the sink device through the cable main link and to receive the control information through the cable auxiliary link, the source device further operable to receive the peripheral information through the auxiliary link, wherein the display peripheral comprises a camera and the peripheral information comprises packetized visual information captured by the camera.

17. The system of claim 16 wherein the peripheral information comprises camera control commands communicated by the source device to the camera through the auxiliary cable link and sink device.

* * * * *